United States Patent
Shetty et al.

(10) Patent No.: US 11,909,784 B2
(45) Date of Patent: Feb. 20, 2024

(54) AUTOMATED ACTIONS IN A CONFERENCING SERVICE

(71) Applicant: VMware LLC, Palo Alto, CA (US)

(72) Inventors: Rohit Pradeep Shetty, Bangalore (IN); Ravish Chawla, Atlanta, GA (US); Adam Chow, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/521,900

(22) Filed: Nov. 9, 2021

(65) Prior Publication Data

US 2023/0033595 A1 Feb. 2, 2023

(30) Foreign Application Priority Data

Jul. 29, 2021 (IN) .............................. 202141034187

(51) Int. Cl.
| | |
|---|---|
| *G06F 15/16* | (2006.01) |
| *H04L 65/403* | (2022.01) |
| *G10L 25/57* | (2013.01) |
| *G10L 15/18* | (2013.01) |
| *G10L 15/22* | (2006.01) |
| *G10L 15/00* | (2013.01) |
| *G06F 40/166* | (2020.01) |
| *G06F 3/16* | (2006.01) |
| *G06V 20/40* | (2022.01) |

(52) U.S. Cl.
CPC ............ *H04L 65/403* (2013.01); *G06F 3/165* (2013.01); *G06F 40/166* (2020.01); *G06V 20/41* (2022.01); *G10L 15/005* (2013.01); *G10L 15/18* (2013.01); *G10L 15/22* (2013.01); *G10L 25/57* (2013.01)

(58) Field of Classification Search
CPC ..... H04L 65/403; G06F 40/166; G06F 3/165; G06V 20/41; G10L 15/005; G10L 15/18; G10L 15/22; G10L 25/57
See application file for complete search history.

(56) References Cited

U.S. PATENT DOCUMENTS

| | | | |
|---|---|---|---|
| 8,743,743 B1 * | 6/2014 | Mai ........................ | H04M 3/566 381/104 |
| 9,420,108 B1 * | 8/2016 | Bostick ................. | H04L 67/535 |
| 9,836,458 B1 * | 12/2017 | Jiang .................... | H04L 12/1822 |
| 9,955,925 B2 * | 5/2018 | Kannan ................ | A61B 5/6801 |
| 10,069,878 B1 * | 9/2018 | Bastide ................. | H04L 65/765 |
| 10,489,430 B1 * | 11/2019 | Rogynskyy ............ | G06F 16/289 |
| 10,581,625 B1 * | 3/2020 | Pandey .................. | H04N 7/147 |
| 2015/0319309 A1 * | 11/2015 | Cunico .................. | H04M 3/568 379/202.01 |
| 2018/0089174 A1 * | 3/2018 | Jiang .................... | H04L 12/1822 |
| 2019/0028520 A1 * | 1/2019 | Nawrocki ............. | G06F 40/205 |
| 2020/0160278 A1 * | 5/2020 | Allen ................... | G06Q 10/1095 |

* cited by examiner

*Primary Examiner* — Oleg Survillo
(74) *Attorney, Agent, or Firm* — King Intellectual Asset Management

(57) ABSTRACT

Disclosed are various approaches for performing automated actions in a conferencing service. Distractions can be detected and users can be muted. Breakout rooms can be suggested to attendees based upon the user's identity. Additionally, event summaries and recaps can be generated for users who are late-arriving or who depart and return to the event.

17 Claims, 4 Drawing Sheets

AUTOMATED ACTIONS IN A CONFERENCING SERVICE

RELATED APPLICATION

Benefit is claimed under 35 U.S.C. 119(a)-(d) to Foreign Application Serial No. 202141034187 filed in India entitled "AUTOMATED ACTIONS IN A CONFERENCING SERVICE", on Jul. 29, 2021, by VMware, Inc., which is herein incorporated in its entirety by reference for all purposes.

BACKGROUND

In an enterprise setting, individuals can collaborate using conferencing applications and services. In some meetings conducted in a conferencing service, interruptions or distractions can occur, particularly as more users operate in a remote environment. Some users may join a meeting late and require information about a portion of the meeting that the user missed.

Additionally, breakout rooms are often a feature provided by a conferencing service, but they can be cumbersome to create for a meeting administrator. In some meetings, users from different organizations or different groups might attend, and breakout rooms can be desired for the various groupings of users. But again, breakout rooms are often an underutilized feature of conferencing services because they require additional steps to create and administer.

Accordingly, existing conferencing systems lack certain usability aspects that can make them more useful to users.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to performing automated actions in a conferencing service. The actions can improve the functionality of existing conferencing services or add features to conferencing services that lack certain usability options. Some conferencing services have the ability to cancel or limit background noises for some attendees. However, there are other distractions that can occur in a meeting or event hosted in a conferencing service. For example, an attendee may have his or her microphone active and inadvertently speak to someone else in the room or building, such as a family member. An attendee may inadvertently cause another distraction, such as a visual distraction that is visible in a video component of the event.

As examples of distractions, the user might be heard speaking in his or her native language to someone in the room or building. For example, the primary language of the event might be English, but the user might inadvertently speak Mandarin or Hindi to a family member in the same room as the attendee.

Additionally, there might exist situations wherein participants of an event might require breakout rooms to discuss confidential issues. For example, a negotiation might include parties from different companies participating in an event hosted using a conferencing service. In one example, participants might connect to the event from their physical locations and representatives from each party could mute a phone and privately discuss their positions in person. In an increasingly remote paradigm, breakout rooms are a feature in a conferencing service that can be utilized to separate attendees into different discussions. However, breakout rooms are often a cumbersome tool to use within a conferencing service. Examples of the disclosure can automatically create or suggest breakout rooms based upon the identity of attendees.

Finally, in some situations, an attendee may join an event late or must step out of the event for a period of time during an ongoing event. In these situations, the user is left to play catch-up or request that the ongoing discussion be paused to bring the user up-to-speed. Accordingly, examples of the disclosure can generate a recap of the event for the period of time where the user was absent and present the recap or summary to the attendee to minimize disruption to other users.

Figure 1:
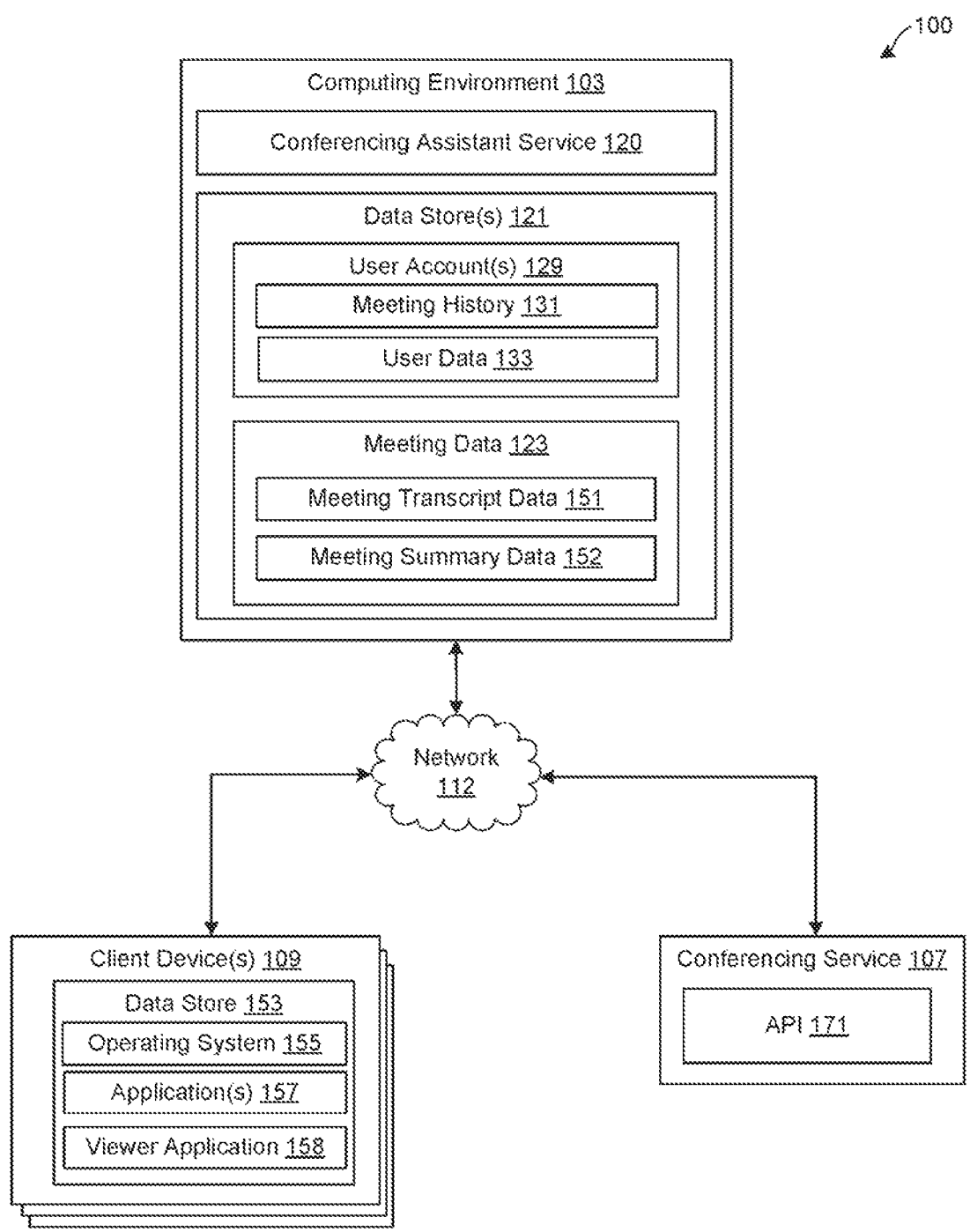
FIG. 1 is a drawing of an example of a networked environment, including client devices, network services, an identity manager service, a workflow service, and other components in communication through a network.

With reference to FIG. 1, shown is an example of a networked environment 100. The networked environment 100 can include a computing environment 103 executing conferencing assistant service 120, conferencing service 107, and a client device 109 in communication through a network 112.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks. The network 112 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 executing the conferencing assistant service 120 can include a server computer or any other system providing computing capability. While referred to in the singular, the computing environment 103 can include a plurality of computing devices that are arranged in one or more server banks, computer banks, or other arrangements. The computing devices of the computing environment 103 can be located in a single installation or can be distributed among many different geographical locations local and/or remote from the other components. The computing environment 103 can include a grid computing resource or any other distributed computing arrangement. The computing environment 103 can also include or be operated as one or more virtualized computer instances. For purposes of convenience, the computing environment 103 is referred to herein in the singular. The components executed on the computing environment 103 can include a conferencing assistant service 120 as well as other applications, services, processes, systems, engines, or functionality not discussed in detail herein.

The conferencing assistant service 120 can operate remotely from a client device 109 associated with an event attendee. The conferencing assistant service 120 can perform actions on behalf of users or attendees of an event in a conferencing service 107. The conferencing assistant service 120 can detect distractions or disruptions and take remedial actions to minimize or suppress the distraction from the event in the conferencing service 107.

The conferencing assistant service 120 can also identify affiliation of attendees and generate or suggest breakout rooms within an event in the conferencing service 107 for groupings of attendees. The groupings of attendees can be segmented according to an organization with which they are affiliated, an email domain name associated with the attendee, a group within an organization as specified by directory service, such as ACTIVE DIRECTORY, or other aspects of the user. The conferencing assistant service 120 can also identify a late arriving attendee to an event in a conferencing service 107 and generate a recap of a previous time period of the event preceding the arrival of the attendee. The recap can also be generated for an attendee who leaves the event and later returns to an ongoing event. The recap can comprise a text summary that also includes imagery, documents, and other materials shared to attendees through the conferencing service 107.

Additionally, the conferencing assistant service 120 can provide an event summary generated from a previous event in the conferencing service 107 that involved the same set of attendees. Accordingly, the conferencing assistant service 120 can determine from a meeting history associated with the respective attendees whether the attendees have previously participated in an event in the conferencing service 107 with the same set of attendees. The conferencing assistant service 120 can generate a summary or recap of the previous event. This summary might include minutes of the meeting or even action items extracted from the previous meeting. This would help in recurring meetings to set the tone and agenda for the current event.

The conferencing assistant service 120 can work in conjunction with a conferencing service 107. The conferencing assistant service 120 can utilize an API 171, or an application programming interface, that is provided by the conferencing service 107. The API 171 can allow for programmatic interactions with the conferencing service 107 and events hosted by the conferencing service 107. In some implementations, the functionality of the conferencing assistant service 120 can be included within the conferencing service 107.

The conferencing assistant service 120 can provide a machine learning service layer and an assistant service layer. The machine learning service layer can provide one or more machine learning service layers that can perform various tasks such as natural language processing, distraction detection, generating meeting recaps and summaries, suggesting breakout rooms assignments, and other tasks as discussed herein. The assistant service layer can create an assistant or bot that can be added to each event that utilizes the conferencing assistant service 120. The assistant can be added to an event as a participant or as an event administrator so that it can interact with the attendees of the event, create breakout rooms, and perform other tasks as discussed herein. Although described above has having two service layers, the conferencing assistant service 120 need not be implemented using a dual service layer architecture. More or fewer service layers can be utilized in its implementation.

The data store 121 can include any storage device or medium that can contain, store, or maintain the instructions, logic, or applications described herein for use by or in connection with the computing environment 103. The data store 121 can be a hard drive or disk of a host, server computer, or any other system providing storage capability. While referred to in the singular, the data store 121 can include a plurality of storage devices that are arranged in one or more hosts, server banks, computer banks, or other arrangements. The data store 121 can include any one of many physical media, such as magnetic, optical, or semiconductor media. More specific examples include solid-state drives or flash memory. The data store 121 can store user information, such as user primary language, past breakrooms created within the conferencing service 107, a past meeting history, and other history or usage data. The data store 121 can be used to abstract away output of a machine learning process that is performed in conjunction with other services. A bot/assistant or a machine learning process that utilize the data store 121 for obtaining relevant information about users and previous meetings.

The data store 121 can include memory of the computing environment 103, mass storage resources of the computing environment 103, or any other storage resources on which data can be stored by the computing environment 103. The data stored in the data store 121 can include, for example, meeting data 123, user accounts 129, and other data that is not depicted and not necessary for a full understanding of examples of the disclosure.

The user accounts 129 can be associated with users of an enterprise. The user accounts 129 can be associated with a directory service that can facilitate user management. The user accounts 129 be associated with authentication data, single sign-on tokens, service records, local connectors, and external connectors. Other information about the user can also be stored as part of the user account 129, such as the user's name, email address, contact information, enterprise responsibilities, and client devices 109. User accounts 129 can also be associated with a meeting history 131. A meeting history 131 represents a history of events hosted by the conferencing service 107 that a particular user has attended. In some cases, the meeting history 131 can represent a history of events hosted by the conferencing service 107 to which the user has been invited, regardless of whether the user has attended the event. The meeting history 131 can be utilized by the conferencing assistant service 120 to determine whether a meeting recap or summary for a subsequent event should be generated in response to the same group of users attending the subsequent event, such as in the case of a recurring meeting.

The user account 129 can also include user data 133, which can include other information about the user. The user data 133 can include a group within an enterprise to which the user belongs. The user data 133 can also identify a role within a group or enterprise, an email address, job title, primary language of the user, and other data. The user data 133 can also be utilized to determine whether to assign the user to a breakout room within the conferencing service 107 with other users who are attended an event hosted by the conferencing service 107. The user data 133 can also include device data for associated client devices 109 assigned to the user. Device data can include one or more of a device identifier, a unique device identifier (UDID), a media access control (MAC) address, an internet protocol (IP) address, or another identifier that uniquely identifies a device with respect to other devices. The device data can include device specifications, and a type of each client device 109. Specifications for the client device 109 can include a hardware configuration that specifies a chipset identifier, a video card identifier, a memory identifier, a monitor or screen identifier, an input device identifier, and a peripheral identifier for each peripheral utilized by the client device 109. Specifications for the client device 109 can include a software configuration that specifies an application identifier for each application installed on the client device 109, a driver or driver version for hardware device and peripheral of the client device 109, an operating system or operating system version installed on the client device 109, and other information.

Meeting data 123 represents information about previous meetings hosted by the conferencing service 107. The meeting data 123 can be obtained by the conferencing assistant service 120 from the conferencing service 107 and archived in the data store 121. The meeting data 123 can include meeting transcript data 151 and meeting summary data 152. Meeting transcript data 151 can include transcripts of previous events hosted by the conferencing service 107 that were also managed or attended by the conferencing assistant service 120. The transcripts can be text transcripts of the discussion based on a natural language processing (NLP) analysis of the discussion of the event. The transcripts can be generated by the conferencing assistant service 120 or obtained from the conferencing service 107 using the API 171. In some instances, a conferencing service 107 can record and/or generate a transcript of an event hosted by the conferencing service 107.

In some examples, transcript data 151 can include a recording of an audio component or a video component of an event. The recording can be captured by the conferencing assistant service 120 as an attendee of the event or captured by the conferencing service 107 retrieved from the conferencing service 107 using the API 171. Summary data 152 can comprise event summaries or event recaps that are generated by the conferencing assistant service 120 from a previous event. An event summary can comprise a summary generated from an event transcript that can be provided to users after conclusion of the event or at the start of a subsequent event, such as an event that has the same attendees as a previous event.

An event summary can be generated using a natural language processing process that can generate a summary from a text transcript or from an audio and/or video recording of the event. The text transcript can summarize the content of the event and content shared between attendees of the event hosted by the conferencing service 107.

The conferencing service 107 can be a third party service or a service that is hosted within the computing environment 103. The conferencing service 107 represents a service in which users can conduct video or audio conferences. Users can join conferences using a client application on a client device 109, by dialing in from a phone, or using a browser-based client. The conferencing service 107 can provide an audio component and/or a video component corresponding to an event to the conferencing assistant service 120. The conferencing service 107 can also provide an API 171 through which the conferencing assistant service 120 can interact with events hosted using the conferencing service 107 and with users or attendees of those events.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, a voice activated smart device, or any other device with like capability. The client device 109 can have an operating system that can perform functionalities and execute applications. The operating system 155 can be stored in a data store 153 that also includes applications 157, a viewer application 158 and other data.

Some applications 157 can include a browser or a dedicated application, and a user interface can include a network page, an application screen, or other interface. The client device 109 can also access web applications using the browser application. Further, other applications 157 can include device management applications, enterprise applications, social networking applications, word processors, spreadsheet applications, media player applications, or other applications.

A viewer application 158 represents an application that is utilized to access events or content from the conferencing service 107. The viewer application 158 can be a client application through which the user can join events, view video from other users who have joined the event, listen to audio shared during the event, and consume or share other content, such as documents, screen-sharing and other features that are utilized in a conferencing service 107. In some examples, the viewer application 158 can receive video and/or audio from the conferencing service 107 and render the content on the client device 109.

A user can create an event within the conferencing service 107 using the viewer application 158 or another user interface provided by the conferencing service 107. In some examples, the user can create an event using an email or calendar client that can communicate with the API 171 to create an event within the conferencing service 107.

The creator or originator of the event can invite other attendees by creating a meeting invitation using an email or calendar client. Alternatively, attendees can be invited using the viewer application 158. The conferencing assistant service 120 can be configured by an enterprise to monitor events created by its users within the conferencing service 107 or on a calendar that include a link to an event within the conferencing assistant service 120. The conferencing assistant service 120 can create an assistant or bot instance that joins the event within the conferencing service 107 along with the other attendees. The assistant can be joined to the event as an administrator so that the conferencing assistant service 120 can create breakout rooms, mute participants of the event, and take other actions as an event administrator.

In examples of this disclosure, the conferencing assistant service 120 can provide an assistant or bot that can join events in the conferencing service 107 as a co-host, allowing attendees to interact with the bot for certain tasks. As noted above, the conferencing assistant service 120 can automatically identify when a user is being distracting and take a remedial action, such as muting the user, lowering the volume of the user, or notifying the user or a meeting organizer of the distraction. The conferencing assistant service 120 can also suggest or create automatic break rooms based on aspects of the attendees, chats between users, a meeting history of the users, or when a conversation between a subset of attendees changes languages.

The conferencing assistant service 120 can provide a recap or summary of an event for a previous time period, such as a time period that a user was absent from the event. The conferencing assistant service 120 can also generate a summary of spoken content, video content, chat and links shared in a previous event that has the same attendee list. The summary can be shared with the attendees.

The conferencing assistant service 120 can generate an assistant or bot instance as a co-host participant in the conferencing service 107 using the API 171. Accordingly, the conferencing assistant service 120 can have access to all information that other attendees have, including both the audio and video components of the event. Using machine learning for processing, the conferencing assistant service 120 can analyze the conversation in real time and take actions based on what is happening in the event audio and video components.

Figure 2:
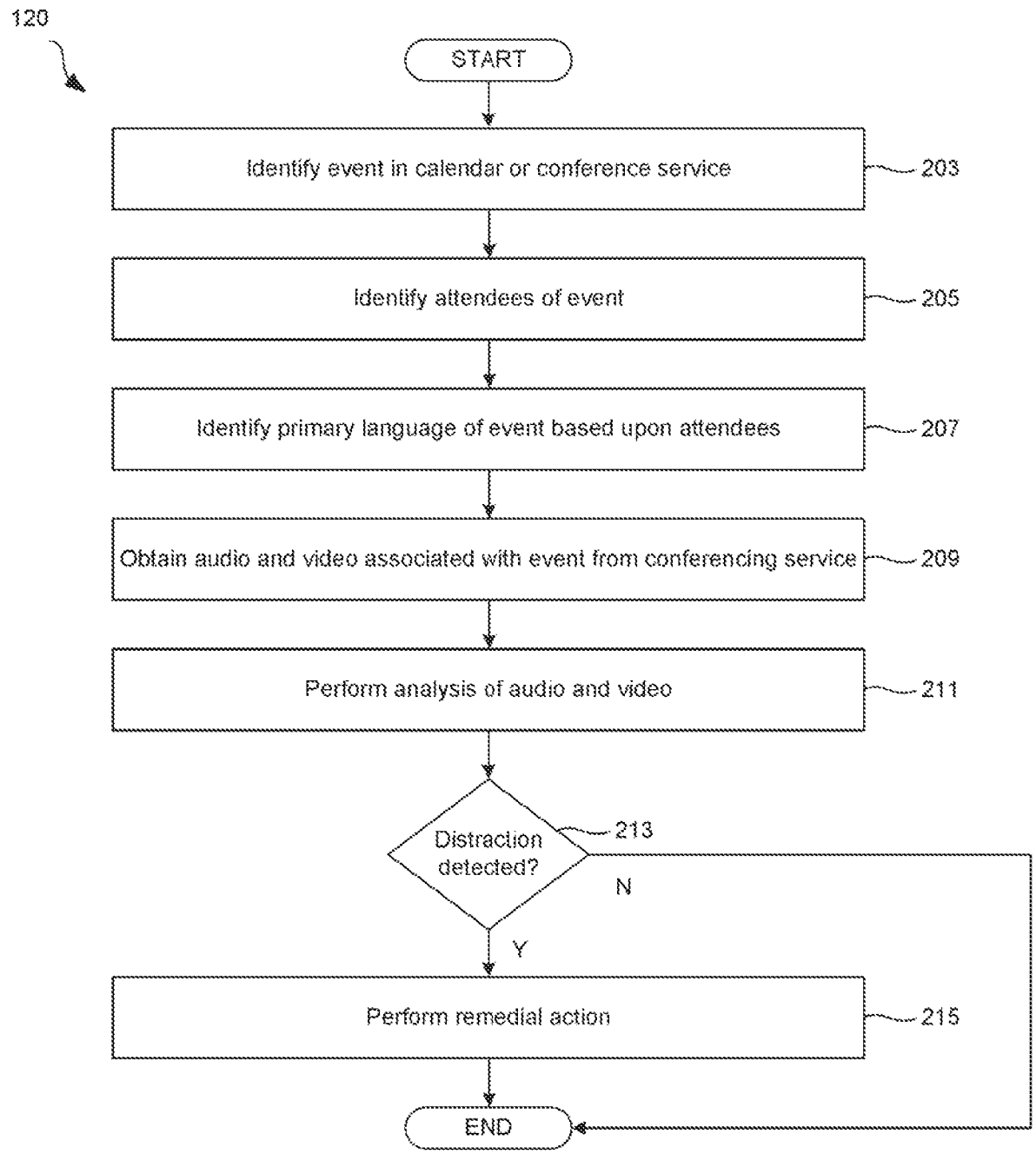
FIG. 2 is a drawing illustrating a neural network utilizing language models according to examples of the disclosure.

Referring next to FIG. 2, shown is a flowchart describing steps that can be performed by the components of the networked environment 100, such as the conferencing assistant service 120. Generally, the flowchart describes how the conferencing assistant service 120 can perform distraction detection within an event hosted by the conferencing service 107 on behalf of the attendees.

First, at step 203, the conferencing assistant service 120 can identify an event in a user's calendar or within the conferencing service 107 that is associated with a particular enterprise or account for which the conferencing assistant service 120 is enabled. In some examples, the conferencing assistant service 120 can be a feature of the conferencing service 107. In other examples, the conferencing assistant service 120 can create an instance of an assistant or a bot that can join the event within the conferencing service 107 as an event administrator so that the conferencing assistant service 120 can take actions with respect to attendees, such as mute or remove attendees causing a distraction, send chat messages via a messaging component of the conferencing service 107, and create breakout rooms within the event within the conferencing service 107.

At step 205, the conferencing assistant service 120 can identify the attendees of the event. In one example, the attendees can be identified from a calendar invitation in a calendar or email system. The conferencing assistant service 120 can identify the attendees based upon an email address or user identifier associated with a calendar event. The conferencing assistant service 120 can also identify attendees based upon a user identifier or email address associated with an account within the conferencing service 107.

At step 207, the conferencing assistant service 120 can identify a primary language associated with the event. The primary language can be identified based upon the identity of the attendees of the event. The conferencing assistant service 120 can determine the geographic location of the attendees based upon user profile information obtained from a directory service or a profile within the conferencing service 107. The conferencing assistant service 120 can also identify a primary language based upon a language setting specified by the event organizer or event host.

At step 209, the conferencing assistant service 120 can obtain an audio component and a video component associated with the event. The audio component and video component can be obtained via the API 171. The audio component and video component represent the audio and video streams from the various attendees of the event.

At step 211, the conferencing assistant service 120 can perform an analysis of the audio component and video component to detect a potential distraction from one or more or the attendees of the event. Based upon an analysis of the video component, an external visual distraction that causes the meeting attendee to look away from the screen and speak in a non-primary language can be considered a distraction in the event. The conferencing assistant service 120 can perform an image recognition of analysis of video frames to determine when an attendee turns his attention, head, or eyes away from a camera associated with a client device 109 and also perform a language analysis of the audio component to determine whether the user is speaking in a language that is different from the primary language of the event.

When only audio is on for an attendee, the conferencing assistant service 120 can detect a background noise or voice that meets a threshold volume level followed by the user speaking in a language different from the primary language within a predetermined or configurable period of time.

Intrusion or distraction detection can be performed by the conferencing assistant service 120 using a machine learning or computer vision model that can use deep neural networks can be used for object identification and classification. Such models can be used to observe changes in a user's view and when an unrecognized object appears in view.

Tone analysis can be accomplished via a SER (Speech Emotion Recognition) model, which can be trained using a RADVESS dataset, which consists of actors performing similar sentences with different emotions. Combined together, a visual object classification and SER model can be used for intrusion or distraction detection when a user is attending an event.

Speech to text can also be used to identify non-English words and noise. These words can be grouped together, and a speech translation library can be used to identify the language being spoken by the user. As multiple users start speaking the same language, this can provide information to the recommendation system to use as a basis for a breakout room in the process discussed in FIG. 3.

At step 213, the conferencing assistant service 120 can determine whether a distraction has occurred in the event within the conferencing assistant service 120. If no distraction has occurred based on the analysis in step 211, the process can proceed to completion.

If a distraction is detected, the process proceeds from step 213 to step 215. At step 215, the conferencing assistant service 120 can take a remedial action in response to detecting the distraction at step 211. A remedial action can include automatically muting the attendee, lowering the volume of the attendee's audio component, or disabling their video feed when a distraction is identified. In some cases, the attendee or the meeting host can also or alternatively be alerted about the distraction and the proposed remedial action.

If the detected distraction involved a user speaking to another attendee in a non-primary language, a breakout room can be recommended for the attendees to the users to enter and continue their conversation. This scenario can be detected if the users are speaking in a non-primary language while looking at their respective cameras that are feeding their respective video into the event in the conferencing service 107.

Thereafter, the process can proceed to completion.

Figure 3:
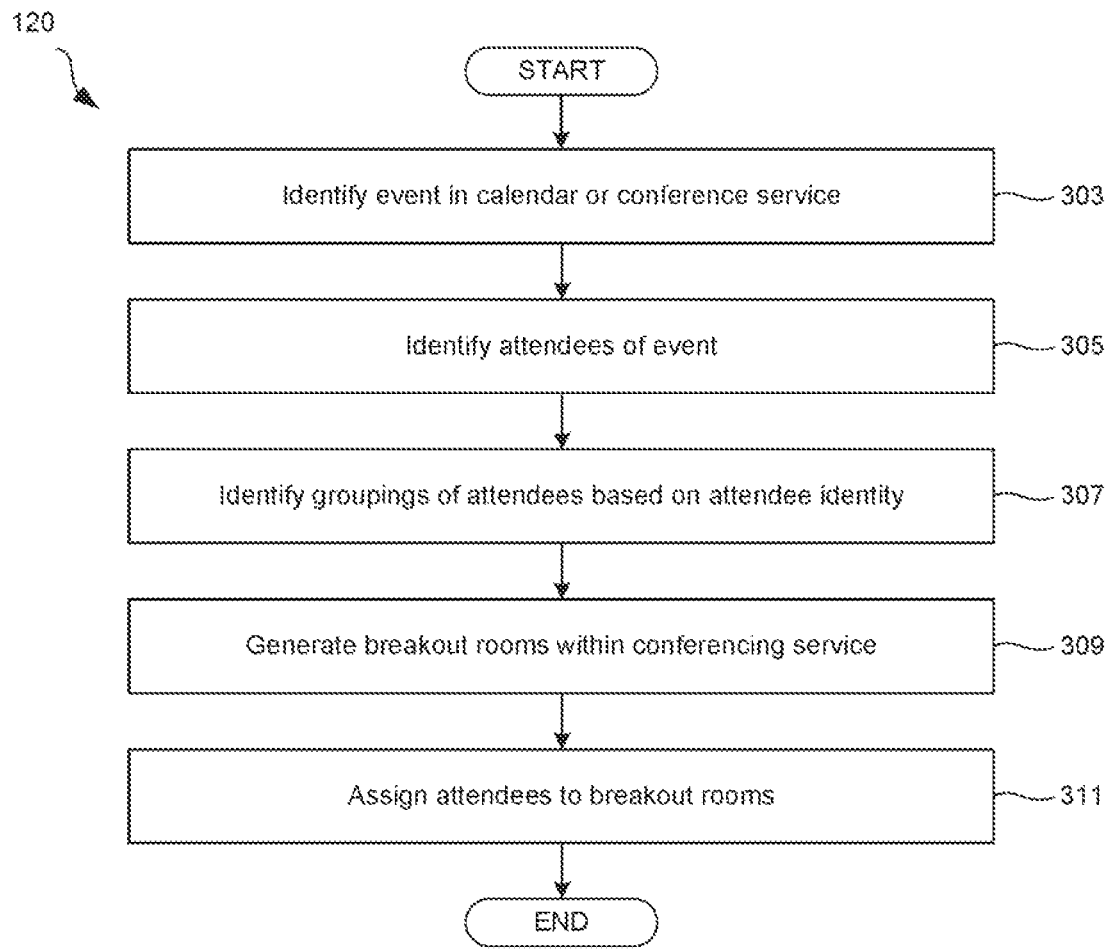
FIG. 3 is a flowchart outlining functionalities implemented by the workflow service and other components of the networked environment.

Referring next to FIG. 3, shown is a flowchart describing steps that can be performed by the components of the networked environment 100, such as the conferencing assistant service 120. Generally, the flowchart describes how the conferencing assistant service 120 can automatically assign attendees to breakout rooms within the conferencing service 107 based upon an identity of respective attendees as well as their respective meeting histories.

First, at step 303, the conferencing assistant service 120 can identify an event in a user's calendar or within the conferencing service 107 that is associated with a particular enterprise or account for which the conferencing assistant service 120 is enabled. In some examples, the conferencing assistant service 120 can be a feature of the conferencing service 107. In other examples, the conferencing assistant service 120 can create an instance of an assistant or a bot that can join the event within the conferencing service 107 as an event administrator so that the conferencing assistant service 120 can take actions with respect to attendees, such as mute or remove attendees causing a distraction, send chat messages via a messaging component of the conferencing service 107, and create breakout rooms within the event within the conferencing service 107.

At step 305, the conferencing assistant service 120 can identify the attendees of the event. In one example, the attendees can be identified from a calendar invitation in a calendar or email system. The conferencing assistant service 120 can identify the attendees based upon an email address or user identifier associated with a calendar event. The conferencing assistant service 120 can also identify attendees based upon a user identifier or email address associated with an account within the conferencing service 107.

At step 307, the conferencing assistant service 120 can identify groupings of attendees based upon their respective identifies. The conferencing assistant service 120 can identify groupings of users based upon their respective email addresses, user identifiers, and other information that can be extracted from a directory service, identity provider, or other data sources to which the conferencing assistant service 120 has access to information about users.

The conferencing assistant service 120 can identify multiple groupings of users. For example, an attendee can be placed into two separate groupings based upon various aspects of the user's identity. Groupings can be identified by email address. For example, users with a particular email domain can be assigned to a grouping together. Users belonging to a particular group within a directory service, such as job function, geographical location, language, team, or other category can be assigned to a grouping.

At step 309, the conferencing assistant service 120 can generate a breakout room for each grouping of users identified at step 307. A breakout room can represent a private virtual conference room for a subset of users that can be created within the conferencing service 107. The conferencing assistant service 120 can request a breakout room to be created using the API 171. The breakout rooms can be sequentially numbered, lettered, or named using a descriptive tag that the conferencing assistant service 120 can generate based upon properties of the groupings identified at step 307.

At step 311, the conferencing assistant service 120 can assign attendees to the breakout rooms based upon the groupings identified at step 307. In some examples, the users can be notified of a breakout room via a messaging component of the conferencing service 107. Accordingly, the conferencing assistant service 120 can utilize the API 171 of the conferencing service 107 to send messages to the attendees, notifying the attendees of a breakout room assignment. The messages can identify one or more breakout rooms to which the user is assigned by the name of the breakout room. In some examples, the conferencing assistant service 120 can provide a link to the breakout room to which the attendee has been assigned.

In some examples, an attendee can interact with the assistant or bot inserted into the event by the conferencing assistant service 120. A user can interact with the bot using a messaging component of the conferencing service 107. The conferencing assistant service 120 can be instrumented with an artificial intelligence (AI) component that can conduct natural language interactions with an attendee. The user can request the bot to cause the conferencing assistant service 120 to create a breakout room on behalf of the user by submitting a text based natural language request to do so. The request can also operate as a feedback loop from which the conferencing assistant service 120 can learn the preferences or needs of the users attending the event. Accordingly, in a subsequent event with the same user or users, the conferencing assistant service 120 can create breakout rooms according to the preferences or needs of the users based upon their interactions with the bot and with the created breakout rooms from a previous event.

For identifying the breakrooms to assign to each user, a user-item recommendation algorithm can be used. User-item based recommendations can be used to suggest an item to a user based on their previous behavior and selections. For example, a Hidden Markov Chain model can be utilized, which uses conditional probabilities of each user against each item to select the combinations with the highest likelihood. A Markov Model can be utilized for recommending break rooms to users, calculating the conditional probability for each user. Users that have a high correlation in likelihood for the same break room can be assigned together.

Thereafter, the process can proceed to completion.

Figure 4:
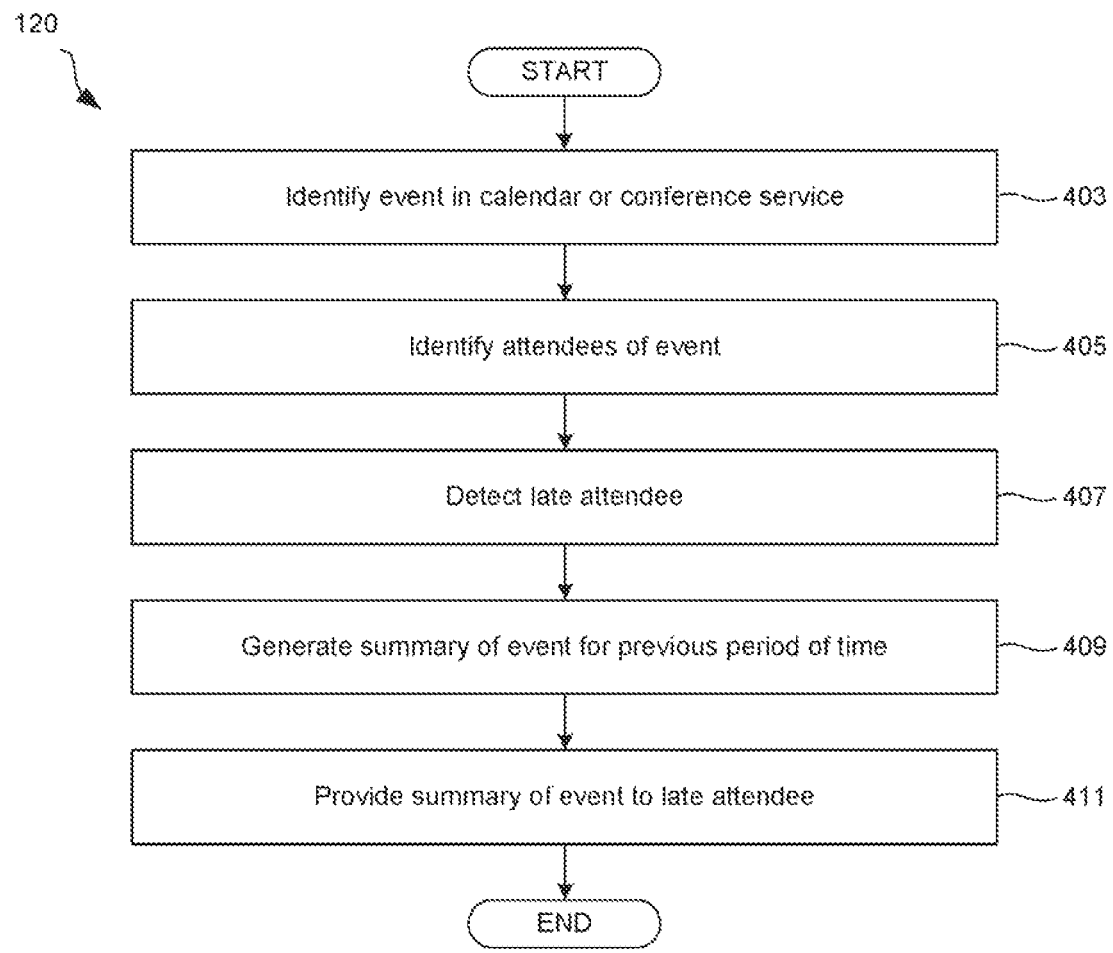
FIG. 4 is another flowchart outlining functionalities implemented by the workflow service and other components of the networked environment.

FIG. 4 shows an example flowchart 400 describing steps that can be performed by the conferencing assistant service 120. Generally, the flowchart 400 describes how the conferencing assistant service 120 can provide an event summary or recap to a late-arriving attendee.

First, at step 403, the conferencing assistant service 120 can identify an event in a user's calendar or within the conferencing service 107 that is associated with a particular enterprise or account for which the conferencing assistant service 120 is enabled. In some examples, the conferencing assistant service 120 can be a feature of the conferencing service 107. In other examples, the conferencing assistant service 120 can create an instance of an assistant or a bot that can join the event within the conferencing service 107 as an event administrator so that the conferencing assistant service 120 can take actions with respect to attendees, such as mute or remove attendees causing a distraction, send chat messages via a messaging component of the conferencing service 107, and create breakout rooms within the event within the conferencing service 107.

At step 405, the conferencing assistant service 120 can identify the attendees of the event. In one example, the attendees can be identified from a calendar invitation in a calendar or email system. The conferencing assistant service 120 can identify the attendees based upon an email address or user identifier associated with a calendar event. The conferencing assistant service 120 can also identify attendees based upon a user identifier or email address associated with an account within the conferencing service 107.

At step 407, the conferencing assistant service 120 can identify a late-arriving attendee or an attendee who has left the event and later returned to the event. The conferencing assistant service 120 can utilize the API 171 to detect when a user joins the event after the event has begun. The conferencing assistant service 120 can also track user attendance during the event and detect when a user leaves the event and when a user rejoins the event.

At step 409, the conferencing assistant service 120 can generate a recap or summary of the event for a previous period of time. The recap or summary can be created for the amount of time that the user was absent from the event. The meeting analysis can include two machine learning systems, one for speech-to-text and another for text-summarization. Thereafter, the process can proceed to completion.

For speech-to-text, a Bert-based Transformer model can be utilized to perform speech-to-text to generate a text transcript of the event. The generated text can be summarized using a sequence-to-sequence neural network. The summarization model can be trained to learn the task of summarization and apply the summarization model to the text transcriptions generated by a Bert-based Transformers model.

To provide a chat bot experience a natural language understanding model with a dialogue based flow can be utilized. An NLP model can be utilized for identifying the intent and primary entities of a written text. A state-based flow algorithm can be used to map each dialogue to an appropriate response and walk the user through the correct steps.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 can include a display upon which a user interface generated by an application can be rendered. In some examples, the user interface can be generated with user interface data provided by the computing environment 103. The client devices 109 can also include one or more input/output devices that can include, for example, a capacitive touchscreen or other type of touch input device, fingerprint reader, or keyboard.

Although the conferencing assistant service 120, client applications 157, and other various services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system. The computer-readable medium can include any one of many physical media, such as magnetic, optical, or semiconductor media. Examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

What is claimed is:

1. A method comprising:
identifying an event in at least one of a user calendar or a conferencing service, the event having a plurality of attendees;
identifying a primary language associated with the event based upon an identity of the attendees;
obtaining an audio component and a video component corresponding to the event;
analyzing the audio component and the video component to identify at least one of a visual distraction or an audio distraction, wherein the visual distraction or the audio distraction is associated with a beginning;
identifying an attendee of the event associated with the at least one of a visual distraction or an audio distraction by detecting a spoken language in a portion of the audio component that is spoken by the attendee during the event and obtained from the attendee that is different from the primary language associated with the event, wherein the portion of the audio component originates from a client associated with the attendee;
performing a remedial action with respect to the attendee in response to identifying the at least one of the visual distraction or the audio distraction;
detect an end of the visual distraction or the audio distraction; and
generate a summary of the event from the beginning and the end, the summary generated based upon spoken content and video content using a natural language processing (NLP) model applied to the spoken content from the beginning and the end of the visual distraction and the audio distraction.

2. The method of claim 1, wherein the remedial action comprises at least one of: muting the attendee, adjusting a volume associated with the attendee, or generating a suggestion for the attendee to be placed into a breakout room within the conferencing service.

3. The method of claim 1, wherein generating the suggestion for at least one breakout room is based upon an identity of the attendees, the suggestion communicated to the attendees using an attendee chat feature associated with the conferencing service.

4. The method of claim 3, wherein the suggestion comprises a first breakout room for a first subset of attendees associated with a first user group and a second breakout room for a second subset of attendees associated with a second user group.

5. The method of claim 1, further comprising detecting a conclusion of the event and generating a text summary of the event based upon a natural language processing process performed on the audio component, wherein the summary of the event is provided to attendees of the meeting through a conferencing service client.

6. A system, comprising:
a computing device comprising at least one processor and at least one memory; and
machine-readable instructions stored in the at least one memory, wherein the instructions, when executed by the at least one processor, cause the computing device to at least:
identify an event in at least one of a user calendar or a conferencing service, the event having a plurality of attendees;
identify a primary language associated with the event based upon an identity of the attendees;
obtain an audio component and a video component corresponding to the event;
analyze the audio component and the video component to identify at least one of a visual distraction or an audio distraction, wherein the visual distraction or the audio distraction is associated with a beginning;
identify an attendee of the event associated with the at least one of a visual distraction or an audio distraction by detecting a spoken language in a portion of the audio component that is spoken by the attendee during the event and obtained from the attendee that is different from the primary language associated with the event, wherein the portion of the audio component originates from a client associated with the attendee;
perform a remedial action with respect to the attendee in response to identifying the at least one of the visual distraction or the audio distraction;
detect an end of the visual distraction or the audio distraction; and
generate a summary of the event from the beginning and the end, the summary generated based upon spoken content and video content using a natural language processing (NLP) model applied to the spoken content from the beginning and the end of the visual distraction and the audio distraction.

7. The system of claim 6, wherein the remedial action comprises at least one of: muting the attendee, adjusting a volume associated with the attendee, or generating a suggestion for the attendee to be placed into a breakout room within the conferencing service.

8. The system of claim 6, wherein the machine-readable instructions generate a suggestion for at least one breakout room based upon an identity of the attendees, the suggestion communicated to the attendees using an attendee chat feature associated with the conferencing service.

9. The system of claim 8, wherein the suggestion comprises a first breakout room for a first subset of attendees associated with a first user group and a second breakout room for a second subset of attendees associated with a second user group.

10. The system of claim 6, wherein the machine readable instructions further cause the at least one computing device to at least detect entry into the event by an attendee after commencement of the event and generate a summary of a previous time period associated with the event.

11. The system of claim 6, wherein the machine readable instructions further cause the at least one computing device to at least detect a conclusion of the event and generate a text summary of the event based upon a natural language processing process performed on the audio component, wherein the summary of the event is provided to attendees of the meeting through a conferencing service client.

12. A non-transitory computer-readable medium comprising machine-readable instructions, wherein the instructions, when executed by at least one processor, cause a computing device to at least:
identify an event in at least one of a user calendar or a conferencing service, the event having a plurality of attendees;
identify a primary language associated with the event based upon an identity of the attendees;

obtain an audio component and a video component corresponding to the event;

analyze the audio component and the video component to identify at least one of a visual distraction or an audio distraction, wherein the visual distraction or the audio distraction is associated with a beginning;

identify an attendee of the event associated with the at least one of a visual distraction or an audio distraction by detecting a spoken language in a portion of the audio component that is spoken by the attendee during the event and obtained from the attendee that is different from the primary language associated with the event, wherein the portion of the audio component originates from a client associated with the attendee;

perform a remedial action with respect to the attendee in response to identifying the at least one of the visual distraction or the audio distraction;

detect an end of the visual distraction or the audio distraction; and generate a summary of the event from the beginning and the end, the summary generated based upon spoken content and video content using a natural language processing (NLP) model applied to the spoken content from the beginning and the end of the visual distraction and the audio distraction.

13. The non-transitory computer-readable medium of claim 12, wherein the remedial action comprises at least one of: muting the attendee, adjusting a volume associated with the attendee, or generating a suggestion for the attendee to be placed into a breakout room within the conferencing service.

14. The non-transitory computer-readable medium of claim 12, wherein the machine-readable instructions generate a suggestion for at least one breakout room based upon an identity of the attendees, the suggestion communicated to the attendees using an attendee chat feature associated with the conferencing service.

15. The non-transitory computer-readable medium of claim 14, wherein the suggestion comprises a first breakout room for a first subset of attendees associated with a first user group and a second breakout room for a second subset of attendees associated with a second user group.

16. The non-transitory computer-readable medium of claim 12, wherein the instructions detect entry into the event by an attendee after commencement of the event and generate a summary of a previous time period associated with the event.

17. The non-transitory computer-readable medium of claim 12, wherein the instructions further cause the at least one computing device to at least detect a conclusion of the event and generate a text summary of the event based upon a natural language processing process performed on the audio component, wherein the summary of the event is provided to attendees of the meeting through a conferencing service client.

* * * * *